United States Patent

[11] 3,537,584

[72] Inventors Ernest G. MacDonald;
 Per R. Berg-Johannessen, Dryden, Ontario, Canada
[21] Appl. No. 783,454
[22] Filed Dec. 5, 1968
 Continuation-in-part of application Ser. No. 739,113, June 21, 1968, abandoned.
[45] Patented Nov. 3, 1970
[73] Assignee Dryden Paper Company, Limited
 Dryden, Ontario, Canada

[54] APPARATUS FOR REMOVING SOLIDS FROM LIQUID SUSPENSIONS THEREOF
 4 Claims, 8 Drawing Figs.
[52] U.S. Cl. .................................................. 210/196,
 210/393, 210/400, 210/456
[51] Int. Cl. ...................................................... B01d 33/32,
 B01d 33/38

[50] Field of Search ............................................ 210/65, 73,
 77, 82, 196, 393, 400, 297, 298, 456

[56] References Cited
 UNITED STATES PATENTS
 2,929,507 3/1960 Komline ......................... 210/400
 3,161,522 12/1964 Compton ....................... 210/400X
 3,440,949 4/1969 Trussell ........................ 210/400

Primary Examiner—John W. Adee
Attorney—Weir, Marshall, Mac Rae and Lamb

ABSTRACT: The invention relates to the removal of solids from liquid suspensions thereof by screening through a travelling belt. The invention includes an apparatus having a belt of perforated plate of uniform thickness, means for cleaning the belt, and means for recirculating a portion of the filtrate through the belt. The invention has particular application in the removal of bark solids from the effluent of barking devices in pulp mills.

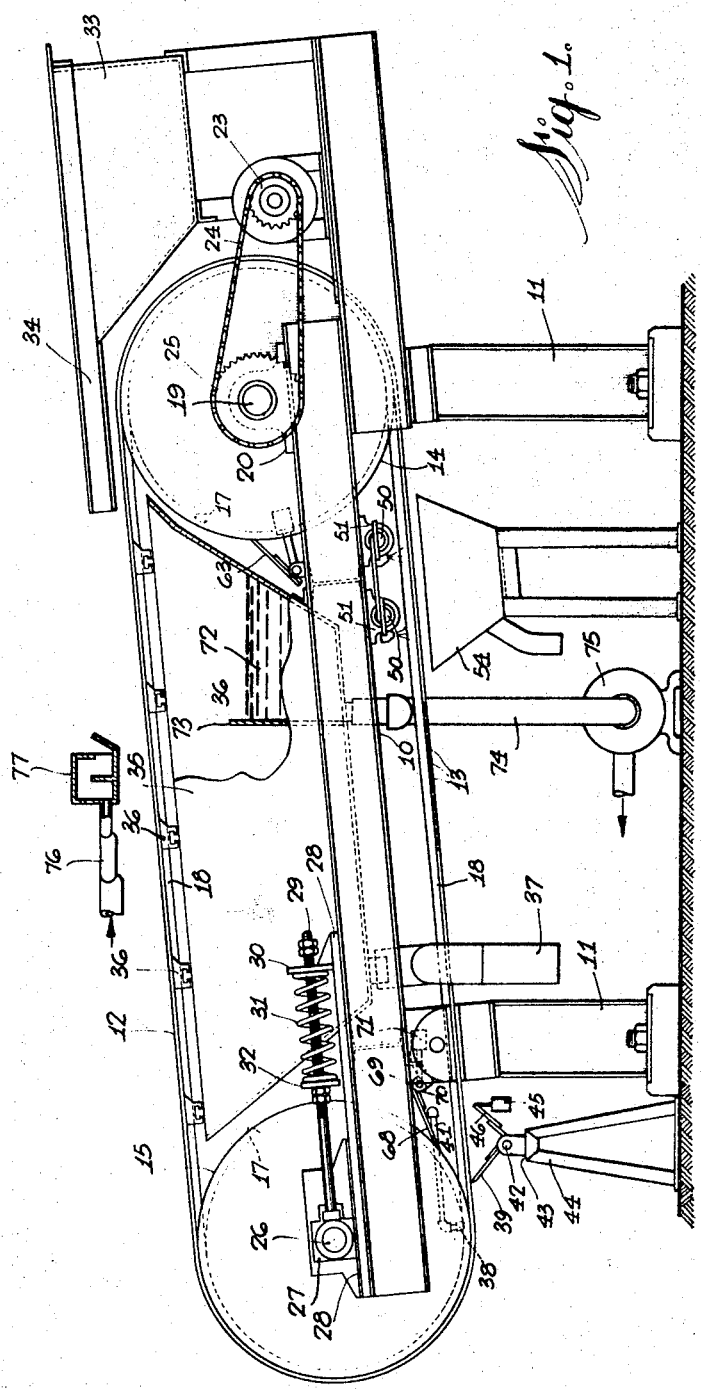

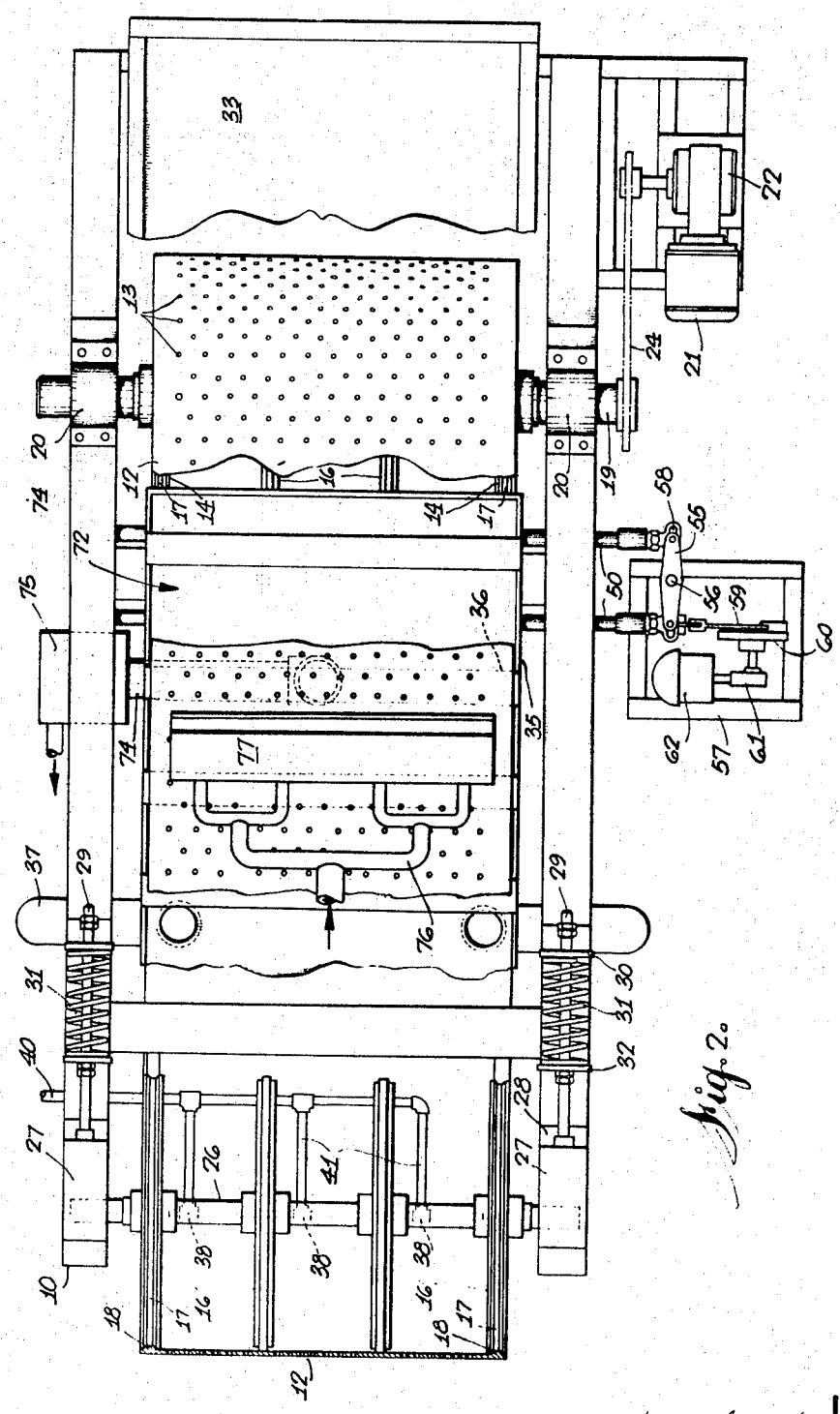

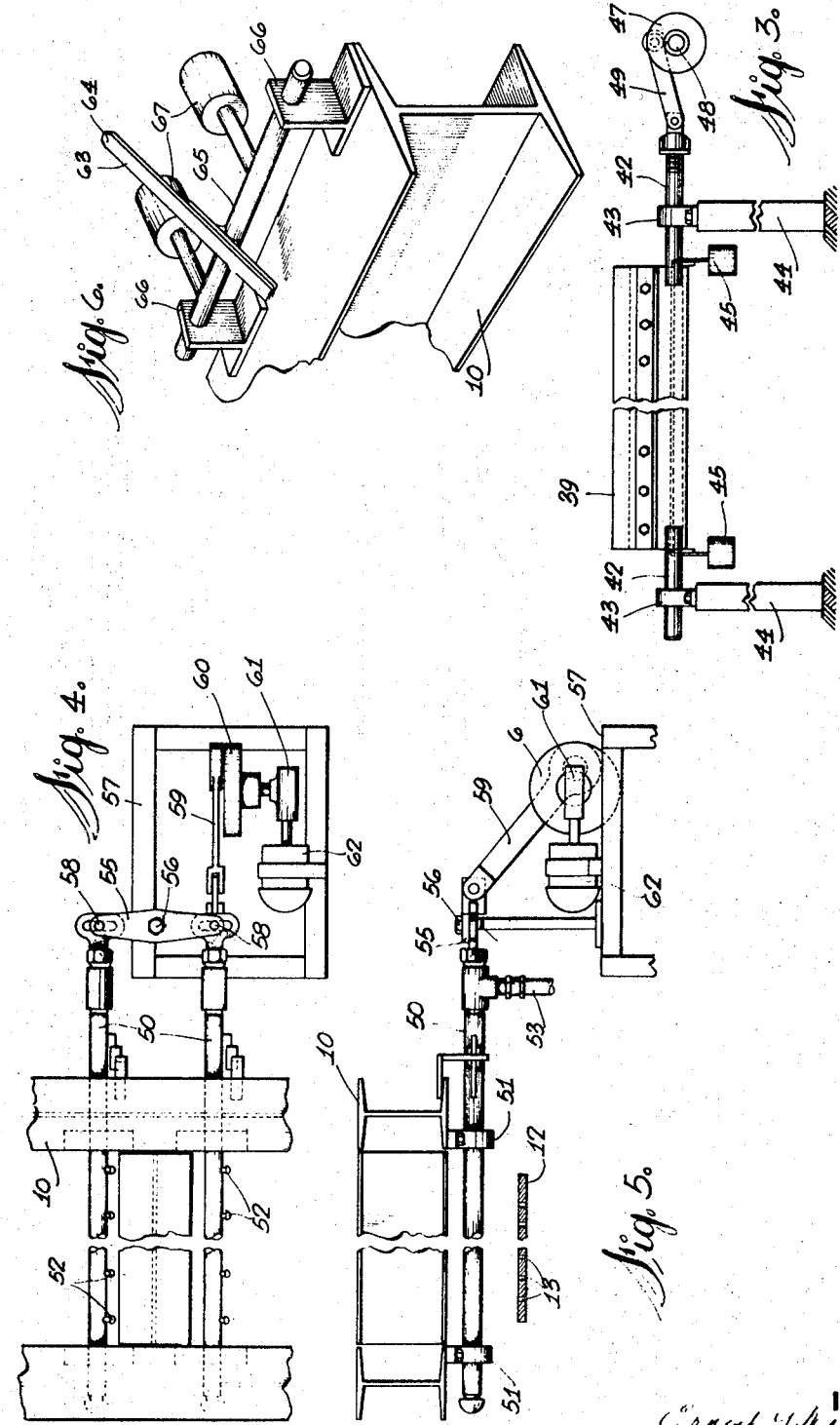

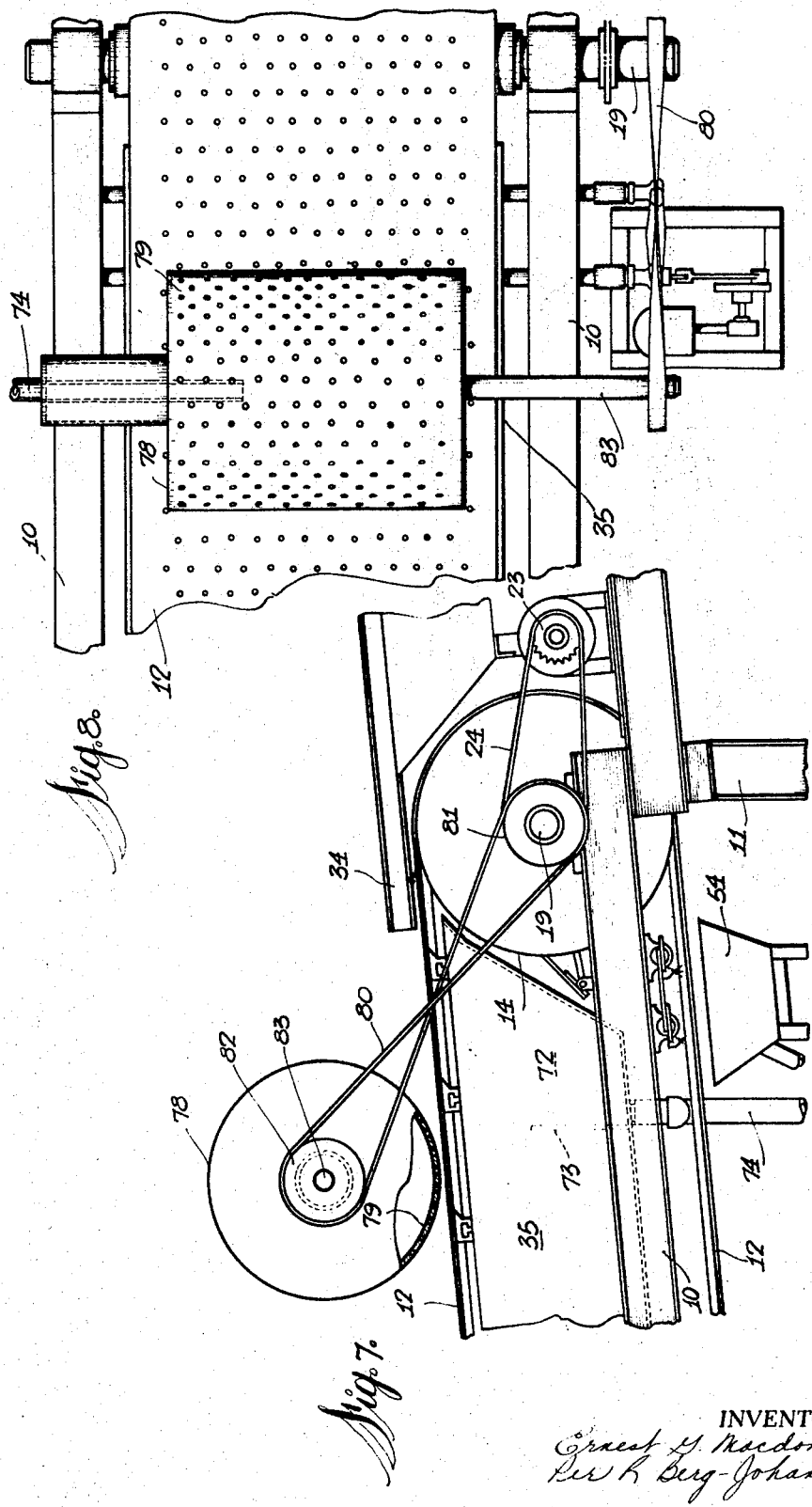

3,537,584

APPARATUS FOR REMOVING SOLIDS FROM LIQUID SUSPENSIONS THEREOF

CROSS-REFERENCE TO RELATED APPLICATIONS

This U.S. Pat. application is a continuation-in-part of Ser. No. 739,113, filed June 21, 1968 now abandoned.

BACKGROUND OF THE INVENTION

1. Field of the Invention

The invention is in the general field of methods and apparatus for removing solids by screening or filtering from liquid suspensions.

2. Description of the Prior Art

The prior art in the general field of screening and filtration is voluminous.

With regard to apparatus details, it has been suggested to utilize a screening device which employs an endless filter belt of a thin sheet of flexible perforated metal (U.S. Pat. No. 2,929,507, Komline). U.S. Pat. Nos. 3,049,236, DeLara et al., and 2,848,113, Paterson et al., show scraper blades for removing separated solids from a belt screen. U.S. Pat. Nos. 3,039,610, Black, and 3,161,522, Compton are representative of the use of shower nozzles for cleaning filter belts.

SUMMARY OF THE INVENTION

Screening equipment finds application in a great many industrial operations. For instance, in the preparation of pulpwood for pulping, the wood is frequently barked wet in drum barkers. The effluent from such barkers containing coarse and fine bark particles is subjected to screening and clarifying steps to remove the bulk of such particles, the remaining water being wasted. The particle size of particles permitted to be wasted is usually under government control, because of restrictions against stream pollution by the dumping of bark and other wood refuse in ponds, lakes and streams.

The present invention seeks to provide, in one specific aspect thereof, a method and apparatus for removing the coarser part of the bark fines from the barker effluent. Without this reduction of solids, a further removal of solids by means of a clarifier would be troublesome. The scrapers would bind up and a centrifuge on the underflow would have to be larger and more expensive.

The suspended solids in the effluent from a bark drainer have a size classification of varying nature. For instance, in one test specimen from a bark drainer of one-quarter inch diameter holes, out of a total of 1,760 p.p.m., 570 p.p.m. were retained on a 12 mesh screen and 530 p.p.m. passed through a 100 mesh screen. In another specimen from the same drainer, out of a total of 2,030 p.p.m., 730 p.p.m. were retained on a 12 mesh screen and 633 p.p.m. passed through a 100 mesh screen. In each case, over 500 p.p.m. passes through a 150 mesh screen.

Tests have shown that at least 50 percent of the solids in the effluent can be removed by using centri-cleaners to concentrate the flow and then a travelling screen in the manner set forth to dewater the resulting portion for easy handling and conveying to a bark press.

The present invention may, however, be applied to the treatment of any liquid suspension from which an efficient removal of solids therefrom is required.

The invention utilizes a travelling screen onto which the suspension under treatment is fed for drainage therethrough. A feature of the invention resides in recirculating to the screen a portion of the filtrate from adjacent the feed end of the screen. The apparatus, which may be employed for treatment of various suspensions, uses as the screen an endless belt of perforated plate of uniform thickness and having continuous inner and outer surfaces. The apparatus also includes means for recirculating a portion of the filtrate and means for effective cleaning of the belt during its return path of movement.

BRIEF DESCRIPTION OF THE DRAWING

FIG. 1 is a side elevation of an apparatus in accordance with the invention,

FIG. 2 is a plan view, partly in section and having parts partially broken away for clarity of illustration, FIG. 3 is an end elevation of a belt cleaning doctor detail, FIG. 4 is a plan view of an oscillating shower pipe detail, FIG. 5 is an end elevation of the detail of FIG. 4, FIG. 6 is a perspective view of a sheave groove cleaner detail, FIG. 7 is a partial side elevation of the apparatus showing a modified filtrate recirculating and distributing means, and FIG. 8 is a partial plan view of the apparatus shown in FIG. 7.

DESCRIPTION OF THE PREFERRED EMBODIMENT

Referring to FIGS. 1 and 2 of the drawings, the apparatus shown comprises a support frame 10 mounted on legs 11.

An endless belt 12, having a multiplicity of perforations 13, is mounted for travelling movement on a drive pulley 14 and a tail pulley 15. Belt 12 is formed from a one-piece sheet of material such as metal, plastic composition, or the like. Stainless steel is a preferred material. The belt has a smooth continuous surface.

The belt is so mounted that it has a downward incline or slope from the drive to the tail end thereof. A slope of one to two inches per foot is satisfactory.

Drive pulley 14 comprises a plurality of sheaves 16, the outer pair of which are circumferentially grooved at 17 to receive a peripheral rib 18 on the under surface of each edge of the belt. Pulley 14 is mounted on a drive shaft 19 supported in bearings 20 fixed to frame 10. Shaft 19 is driven by motor 21 through gear reducer 22, sprocket 23, chain 24, and sprocket 25.

Pulley 15 is mounted on a tail shaft 26 supported in bearings 27 on frame 10. Pulley 15 also comprises a plurality of sheaves 16, the outer pair of which are circumferentially grooved at 17 to receive the peripheral ribs 18 of the belt. Bearings 27 are adjustably spring-loaded in order to maintain the belt under suitable tension during operation. To this end, each bearing is seated on a base plate 28 fixed to frame 10 and has attached thereto a bar 29 having its end portion supported in a flange 30 fixed to base 28. A coil spring 31 on bar 29 having its end portion supported in a flange 30 fixed to base 28. A coil spring 31 on bar 29 has one end bearing against flange 30 and its other end bearing against an adjustably positioned plate 32.

Means for feeding suspension onto the upper travelling section of the belt adjacent the elevated or drive end thereof comprises a head box 33 mounted on frame 10 and having a shallow portion 34 overhanging the belt as it leaves the drive pulley 14. Portion 34 is in substantially parallel relation to the belt and has a width approximately equal to that of the belt whereby a uniform feed of suspension onto the belt is provided.

A flow box 35 mounted on frame 10 receives the filtrate draining through the belt perforations during the upper travelling period of the belt. A plurality of transversely extending foil bars 36 mounted on the box 35 engage the under surface of the belt and provide more efficient drainage therefrom. The flow box has a drain 37.

Means for removing the solid material retained on the outer surface of the belt comprises a plurality of high pressure air jets 38 directed onto the inner surface of the belt as it leaves tail pulley 15 and a doctor blade 39 bearing upon the outer surface of the belt immediately following the application of jets 38.

Air is supplied to jets 38 through an inlet pipe 40 having branches 41 leading to the jets.

Referring to FIGS. 1 and 3, the doctor blade 39 is carried by stub shafts 42 journalled in bearings 43 mounted on brackets 44. Counterweight 45 suspended from an arm 46 fixed to each shaft 42 applies required pressure of the blade edge on the belt. Means are preferably provided for oscillating the blade and, as shown, comprises a crank 47 fixed to a driven shaft 48 and a link 49 connecting one of the shafts 42 with the crank.

Means for cleaning the belt comprises a pair of transversely extending shower pipes 50 journalled in pillow blocks 51 mounted on frame 10 adjacent the inner surface of the lower travelling section of the belt as it approaches drive pulley 14. Each pipe 50 has a plurality of nozzles 52 directed onto such inner surface and adapted to apply high pressure water jets thereon. Water is supplied to each pipe through a flexible hose connection 53. The sprayed water is collected in a trough 54 below the belt.

Referring to FIGS. 2, 4 and 5, means are provided for oscillating the shower pipes 50 and comprises a rocker arm 55 pivotally mounted at 56 on a stand 57, each end of arm 55 having a pin and slot connection 58 with the end of a pipe 50. The end of one pipe 50 is also connected by means of a connecting rod 59 with a crank 60 driven through suitable gearing 61 by motor 62 mounted on stand 57. It will be apparent that the shower pipes will thus oscillate in mutally reverse directions across the belt.

Referring to FIGS. 1 and 6, means are also provided for cleaning the grooves 17 in the sheaves of both pulleys 14 and 15.

For each groove 17 of drive pulley 14 there is provided a cleaning finger 63 the tip 64 of which extends into groove 17 and engages the walls thereof. The finger is fixed to a pin 65 journalled in brackets 66 mounted on frame 10. Counterweights 67 fixed to the pin place the finger in pressure engagement with the groove walls.

For each groove 17 of tail pulley 15, a similar finger 68 has its tip in engagement with the walls of the groove. The finger is fixed to a pin 69 journalled in brackets 70 fixed to frame 10. Counterweights 71 place the finger in pressure engagement with the groove walls.

An important feature of the invention resides in the provision of means for recirculating a portion of the filtrate. The filtrate portion that has passed through the perforated belt 12 immediately after being fed onto the belt from head box 33 will be particularly heavy in suspended solids and it is this portion of the filtrate that is recirculated. To this end, a minor section 72 of the flow box immediately adjoining the feed end is separated from the remaining section thereof by means of a transversely extending baffle 73. The filtrate in section 72 is returned to the top of the moving belt 12 at a location on the belt about one-third of the distance from the feed end thereof or immediately following the initial drainage period into section 72.

Means for returning this filtrate portion and distributing it on the belt may comprise a pipe 74, a pump 75 in the pipe, a flow distributing pipe section 76 connected to pipe 74 and located above the upper travelling section of the belt, and an overflow weir 77 into which pipe section 76 discharges.

An alternative means for returning and distributing the filtrate portion is illustrated in FIGS. 7 and 8 and comprises a hollow drum 78 mounted for rotation above the belt in approximately the same location as weir 77. Drum 78 has its cylindrical wall 79 perforated as shown. Pipe 74 extends through one of the journals of the drum and discharges filtrate into the interior of the drum. The drum is driven at the same speed as the belt 12 by means of a belt 80, pulley 81 on drive shaft 19, and pulley 82 on shaft 83 of the drum.

It will be observed that the recirculated filtrate is deposited onto the belt at a location where a mat of solids has already been deposited thereon. This results in a most significant improvement in the efficiency of the filtration treatment. Actually, it has been found that bark fines retention is improved from about 50 to about 60 percent by recirculating the filtrate in the manner described.

It will be apparent that the use of a one-piece perforated metallic or like plate of uniform thickness and smooth continuous surface formed into an endless belt is an important feature of the invention. Such a belt may travel at a rate of say, 10 f.p.m., which facilitates cleaning on the return side with air and water jets.

It will also be apparent that the apparatus described is of particular value in cases (such as treatment of barker effluent) where only relatively coarse suspended matter is being reclaimed.

This fraction of the fines is quite free draining and may be fed to a bark press without causing any problem. If not taken out, this fraction would probably give rise to problems in a conventional clarifier. The smaller particle size fines which go through the belt with the filtrate would not be likely to drain in a bark press but these will not interfere with the effective operation of a clarifier. Thus, in addition to effecting a filtering operation, the apparatus is of value in performing a particle size classification.

We claim:

1. Screening apparatus comprising an endless belt of perforated plate of uniform thickness having smooth continuous outer and inner surfaces, a pair of pulleys mounting said belt for travelling movement thereon, said belt having upper and lower paths of movement, a head box for feeding a liquid suspension onto said belt adjacent one end of said upper path of movement and constituting a feed end thereof, a flow box mounted beneath said upper path of movement for receiving filtrate from said suspension draining through said belt, said flow box having an independent section beneath a first portion of said upper path of movement immediately adjoining said feed ends, means for supplying a portion of said filtrate in said flow box to said belt during said upper path of movement comprising filtrate distributing means above a second portion of said upper path of movement immediately following said first portion, said filtrate distributing means comprising a rotatably mounted drum having a foraminate cylindrical wall, and means for rotating said drum, and means for supplying filtrate from said flow box section to said distributing means, and means for cleaning said belt during said lower path of movement.

2. Screening apparatus comprising an endless belt of perforated plate of uniform thickness having smooth continuous outer and inner surfaces, a pair of pulleys mounting said belt for travelling movement thereon, said belt having upper and lower paths of movement, a head box for feeding a liquid suspension onto said belt adjacent one end of said upper path of movement and constituting a feed end thereof, a flow box mounted beneath said upper path of movement for receiving filtrate from said suspension draining through said belt, means for supplying a portion of said filtrate in said flow box to said belt during said upper path of movement, and means for cleaning said belt during said lower path of movement comprising, in successive transverse relation to said belt, a row of compressed air applying jets, a doctor blade in engagement with the outer surface of said belt, means pivotally mounted on said doctor blade for swinging movement into engagement with said belt, means urging said blade into pressure engagement with said belt, means for oscillating said blade, and a row of water applying nozzles.

3. Screening apparatus comprising an endless belt of perforated plate of uniform thickness having smooth continuous outer and inner surfaces, a pair of pulleys mounting said belt for travelling movement thereon, said belt having upper and lower paths of movement, a head box for feeding a liquid suspension onto said belt adjacent one end of said upper path of movement and constituting a feed end thereof, a flow box mounted beneath said upper path of movement for receiving filtrate from said suspension draining through said belt, means for supplying a portion of said filtrate in said flow box to said belt during said upper path of movement, means for cleaning said belt during said lower path of movement comprising in successive transverse relation to said belt, a row of compressed air applying jets, a doctor blade in engagement with the outer surface of said belt, and a row of water applying nozzles, said pulleys having a pair of circumferential grooves, said belt having peripheral ribs for reception in said grooves, and means for cleaning each of said grooves comprising a finger having a tip engaging the walls of said groove, a pin fixed to said finger, brackets journalling said pin for rotation and swinging movement of said finger, and means urging said pin in one direction of rotation to cause pressure engagement of said finger tip with said groove walls.

4. Screening apparatus comprising an endless belt of perforated plate of uniform thickness having smooth continuous outer and inner surfaces, a pair of pulleys mounting said belt for travelling movement thereon, said belt having upper and lower paths of movement, a head box for feeding a liquid suspension onto said belt adjacent one end of said upper path of movement and constituting a feed end thereof, a flow box mounted beneath said upper path of movement for receiving filtrate from said suspension draining through said belt, a plurality of foil bars on said flow box extending transversely of and engaging the inner surface of said belt in said upper path of movement, means for supplying a portion of said filtrate in said flow box to said belt during said upper path of movement, and means for cleaning said belt during said lower path of movement.